US010354199B2

(12) United States Patent
Clinchant et al.

(10) Patent No.: US 10,354,199 B2
(45) Date of Patent: Jul. 16, 2019

(54) TRANSDUCTIVE ADAPTATION OF CLASSIFIERS WITHOUT SOURCE DATA

(71) Applicant: Xerox Corporation, Norwalk, CT (US)

(72) Inventors: Stéphane Clinchant, Grenoble (FR); Gabriela Csurka, Crolles (FR); Boris Chidlovskii, Meylan (FR)

(73) Assignee: Xerox Corporation, Norwalk, CT (US)

( * ) Notice: Subject to any disclaimer, the term of this patent is extended or adjusted under 35 U.S.C. 154(b) by 739 days.

(21) Appl. No.: 14/960,869

(22) Filed: Dec. 7, 2015

(65) Prior Publication Data

US 2017/0161633 A1 Jun. 8, 2017

(51) Int. Cl.
*G06N 20/00* (2019.01)
*G06N 3/04* (2006.01)

(52) U.S. Cl.
CPC .......... *G06N 20/00* (2019.01); *G06N 3/0454* (2013.01)

(58) Field of Classification Search
CPC ............... G06N 5/04; G06N 99/005
See application file for complete search history.

(56) References Cited

U.S. PATENT DOCUMENTS

| | | | |
|---|---|---|---|
| 2012/0185415 A1* | 7/2012 | Chenthamarakshan | G06N 99/005 706/12 |
| 2013/0013540 A1* | 1/2013 | He | G06N 99/005 706/12 |
| 2013/0297622 A1 | 11/2013 | Clinchant | |
| 2014/0029839 A1 | 1/2014 | Mensink et al. | |
| 2015/0279036 A1 | 10/2015 | Artan et al. | |

OTHER PUBLICATIONS

Chen et al., "Marginalized Denoising Autoencoders for Domain Adaptation", Proceedings of the 29th International Conference on Machine Learning, 2012, pp. 1-8.*
Patel et al., "Visual domain adaptation: a survey of recent advances", IEEE Signal Processing Magazine, vol. 32, 2014, pp. 53-69.*
Gopalan et al. Domain adaptation for object recognition: An unsupervised approach, ICCV, 2011, pp. 999-1006.*

(Continued)

*Primary Examiner* — Kamran Afshar
*Assistant Examiner* — Brent Johnston Hoover
(74) *Attorney, Agent, or Firm* — Fay Sharpe LLP

(57) ABSTRACT

A classification method includes receiving a collection of samples, each sample comprising a multidimensional feature representation. A class label prediction for each sample in the collection is generated with one or more pretrained classifiers. For at least one iteration, each multidimensional feature representation is augmented with a respective class label prediction to form an augmented representation, a set of corrupted samples is generated from the augmented representations, and a transformation that minimizes a reconstruction error for the set of corrupted samples is learned. An adapted class label prediction for at least one of the samples in the collection is generated using the learned transformation and information is output, based on the adapted class label prediction. The method is useful in predicting labels for target samples where there is no access to source domain samples that are used to train the classifier and no access to target domain training data.

20 Claims, 3 Drawing Sheets

(56) References Cited

OTHER PUBLICATIONS

U.S. Appl. No. 14/504,837, filed Oct. 2, 2014, Csurka, et al.
U.S. Appl. No. 14/633,550, filed Feb. 27, 2015, Bhatt, et al.
U.S. Appl. No. 14/691,021, filed Apr. 20, 2015, Perronnin, et al.
U.S. Appl. No. 14/793,374, filed Jul. 7, 2015, Soldevila, et al.
U.S. Appl. No. 14/793,434, filed Jul. 7, 2015, Soldevila, et al.
U.S. Appl. No. 14/861,386, filed Sep. 22, 2015, Rodríguez-Serrano, et al.
U.S. Appl. No. 14/950,544, filed Nov. 24, 2015, Csurka, et al.
Baktashmotlagh, et al., "Unsupervised domain adaptation by domain invariant projection," ICCV, pp. 769-776 (2013).
Beijbom, "Domain adaptations for computer vision applications," CoRR, abs/1211.4860, pp. 1-9 (2012), *arXiv preprint arXiv*:1211.4860 (2012).
Blitzer, et al., "Domain adaptation with coupled subspaces," Int'l Conf. on Artificial Intelligence and Statistics (ICAIS), pp. 173-181 (2011).
Chen, et al. "Marginalized denoising autoencoders for domain adaptation," *arXiv preprint arXiv*:1206.4683, pp. 1-8 (2012).
Csurka, et al., "Domain adaptation with a domain specific class means classifier," Computer Vision—ECCV 2014 Workshops (TASK-CV), pp. 32-46 (2014).
Duan, et al., "Domain adaptation from multiple sources via auxiliary classifiers," ICML, pp. 289-296 (2009).
Farajidavar, et al., "Adaptive transductive transfer machines," BMVC, pp. 623-639 (2014).
Fernando, et al., "Unsupervised visual domain adaptation using subspace alignment," ICCV, pp. 2960-2967 (2013).
Ganin, et al., "Unsupervised domain adaptation by backpropagation," CoRR, arXiv:1409.7495, pp. 1-11 (2014).
Glorot, et al., "Domain adaptation for large-scale sentiment classification: A deep learning approach," ICML, pp. 513-520 (2011).
Gong, et al., "Reshaping visual datasets for domain adaptation," Advances in Neural Information Processing Systems (NIPS), pp. 1286-1294 (2013).
Gong, et al., "Geodesic flow kernel for unsupervised domain adaptation," 2012 IEEE Conf. on Computer Vision and Pattern Recognition (CVPR), pp. 2066-2073 (2012).
Gong, et al., "Connecting the dots with landmarks: Discriminatively learning domain-invariant features for unsupervised domain adaptation," Proc. 30th Int'l Conf. on Machine Learning, ICML 2013, pp. 222-230 (2013).
Gopalan, et al., "Domain adaptation for object recognition: An unsupervised approach," ICCV, pp. 999-1006 (2011).
Hoffman, et al., "Discovering latent domains for multisource domain adaptation," ECCV, pp. 702-715 (2012).
Jhuo, et al., "Robust visual domain adaptation with low-rank reconstruction," CVPR, pp. 2168-2175 (2012).
Jiang, et al., "A Literature Survey on Domain Adaptation of Statistical Classifiers," Technical report, pp. 1-12 (2008).
Krizhevsky, et al., "ImageNet classification with deep convolutional neural networks," NIPS, pp. 1097-1105 (2012).
Pan, et al. "Transfer Learning for Text Mining," Mining Text Data, pp. 223-257(2012).
Pan, et al., "A survey on transfer learning," IEEE Trans. on Knowledge and Data Engineering, vol. 22(10):1345-1359 (2010).
Patel, et al., "Visual domain adaptation: a survey of recent advances," *IEEE Signal Processing Magazine*, vol. 32, No. 3, pp. 53-69 (May 2015, draft dated 2014).
Russakovsky, et al., "ImageNet large scale visual recognition challenge," Int'l J. Computer Vision, 1-42, arXiv 1409.0575, pp. 1-37 (2014).
Saenko, et al., "Adapting visual category models to new domains," ECCV, vol. 6314 of Lecture Notes in Computer Science, pp. 213-226 (2010).
Vincent, et al., "Extracting and composing robust features with denoising autoencoders," Proc. 25th Int'l Conf. on Machine learning (ICML), pp. 1096-1103 (2008).
Xu, et al., "From sBoW to dCoT marginalized encoders for text representation," Proc. 21st ACM Int'l Conf. on Information and knowledge management (CIKM), pp. 1879-1884 (2012).
Xu, et al., "Multi-view transfer learning with multi-view Adaboost," in Tingwen Huang, et al., editors, NIPS, vol. 7665 of Lecture Notes in Computer Science, pp. 332-339, Springer Berlin Heidelberg (2012).

\* cited by examiner

TRANSDUCTIVE ADAPTATION OF CLASSIFIERS WITHOUT SOURCE DATA

BACKGROUND

The exemplary embodiment relates to domain adaptation and finds particular application in connection with a system and method for domain adaptation in the case where there is no access to labeled source data.

Domain adaptation aims at learning robust features in order to transfer models from a source dataset to a different but related target domain. Most domain adaptation methods assume that source data is readily available. In practice, however, such an assumption rarely holds due to technical and legal constraints.

Domain Adaptation (DA) problems arise when there is a need to leverage labeled data in one or more related source domains, to learn a classifier for unseen data in a target domain. Such a situation occurs in numerous applications. Examples include named entity recognition across different text corpora, object recognition in images acquired in different conditions (such as different background scenes, object location, and pose or viewing angle changes), extracting opinions from reviews, and the like. See I.-H. Jhuo, et al., "Robust visual domain adaptation with low-rank reconstruction," CVPR, pp. 2168-2175, 2012, for a survey on domain adaptation methods.

Different approaches have been proposed to address the text and visual domain adaptation (see, for example, L. Duan, et al., "Domain adaptation from multiple sources via auxiliary classifiers," ICML 2009; K. Saenko, et al., "Adapting visual category models to new domains," ECCV 2010; X. Glorot, et al., "Domain adaptation for large-scale sentiment classification: A deep learning approach," ICML 2011, hereinafter, "Glorot 2011"; R. Gopalan, et al., "Domain adaptation for object recognition: An unsupervised approach," ICCV 2011; O. Beijbom, "Domain adaptations for computer vision applications," CoRR, arXiv:1211.4860, 2012; B. Gong, et al., "Reshaping visual datasets for domain adaptation," NIPS 2013; M. Baktashmotlagh, et al., "Unsupervised domain adaptation by domain invariant projection, ICCV 2013, B. Fernando, et al., "Unsupervised visual domain adaptation using subspace alignment, ICCV 2013, Y. Ganin, et al., "Unsupervised domain adaptation by back-propagation," CoRR, arXiv:1409.7495, 2014; and N. Farajidavar, et al., "Adaptive transductive transfer machines," BMVC 2014. I.-H. Jhuo, et al., "Robust visual domain adaptation with low-rank reconstruction," CVPR, pp. 2168-2175, 2012, provides a survey of domain adaptation methods with a focus on the learning theory and natural language processing applications.

Most of these DA methods made an assumption of largely available source domain collections. An access to both source and target data allows to measure the discrepancy between their distributions and 1) either build representations common to both target and sources, using the deep learning methods (M. Chen, et al. "Marginalized denoising autoencoders for domain adaptation," arXiv preprint arXiv: 1206.4683, 2012, hereinafter, "Chen 2012"; Z. Xu, et al., "From sBoW to dCoT marginalized encoders for text representation," Proc. 21st ACM Int'l Conf. on Information and knowledge management (CIKM), pp. 1879-1884, 2012, hereinafter, "Xu 2012"), geodesic flow methods (B. Gong, et al., "Geodesic flow kernel for unsupervised domain adaptation," 2012 IEEE Conference on Computer Vision and Pattern Recognition (CVPR), pp. 2066-2073, 2012]) or 2) develop techniques for a direct reuse of source instances for a better target classification (Z. Xu, et al., "Multi-source transfer learning with multi-view adaboost," in Tingwen Huang, et al., editors, NIPS, volume 7665 of Lecture Notes in Computer Science, pages 332-339, Springer Berlin Heidelberg, 2012).

In reality, the assumption of available source instances rarely holds. The source instances may become unavailable for technical reasons, or are disallowed to store for legal and privacy reasons. More realistic are situations where the source domain instances cannot be accessed but the source decision making procedures are available. These procedures are often presented in the form of classification services, which were trained on source data, available for a direct deployment and later reuse.

INCORPORATION BY REFERENCE

The following references, the disclosures of which are incorporated herein by reference in their entireties, are mentioned:

U.S. application Ser. No. 14/950,544, filed Nov. 24, 2015, entitled ADAPTED DOMAIN SPECIFIC CLASS MEANS CLASSIFIER, by Gabriela Csurka, et al.

U.S. application Ser. No. 14/504,837, filed on: Oct. 2, 2014, entitled SYSTEM FOR DOMAIN ADAPTATION WITH A DOMAIN SPECIFIC CLASS MEANS CLASSIFIER, by Gabriela Csurka, et al.

U.S. application Ser. No. 14/633,550, filed Feb. 27, 2015, entitled CONTENT-AWARE DOMAIN ADAPTATION FOR CROSS-DOMAIN CLASSIFICATION, by Himanshu Sharad Bhatt, et al.

BRIEF DESCRIPTION

In accordance with one aspect of the exemplary embodiment, a classification method includes receiving a collection of samples, each sample comprising a multidimensional feature representation. With a pretrained classifier, a class label prediction for each of the samples in the collection is generated. For at least one iteration, each multidimensional feature representation is augmented with a respective class label prediction to form an augmented representation, a set of corrupted samples is generated from the augmented representations, and a transformation that minimizes a reconstruction error for the set of corrupted samples is learned. An adapted class label prediction for at least one of the samples in the collection is generated using the learned transformation and information is output, based on the adapted class label prediction. One or more of the steps of the method may be performed with a processor.

In accordance with another aspect of the exemplary embodiment, a classification system includes a first prediction component which uses a pretrained classifier to generate a class label prediction for each sample in a collection of unlabeled samples. Each sample includes a multidimensional feature representation. A learning component includes a stack of autoencoders, each of the autoencoders including an encoder which corrupts input feature vectors and a decoder which reconstructs the input feature vectors from the corrupted feature vectors, a transformation being learned to minimize the reconstruction error. In a first of the layers, the input feature vectors include the multidimensional feature representations augmented by their class label predictions and in a second of the layers, the input feature vectors are based on class label predictions output by the first layer. A second prediction component generates an adapted class label prediction for at least one of the samples in the collection using the learned transformation. An output component outputs information based on the adapted class label prediction. A processor implements the components.

In accordance with another aspect of the exemplary embodiment, a classification method includes receiving a collection of samples, each sample comprising a multidimensional feature representation. With a pretrained classifier, a class label prediction is generated for each of the samples in the collection. In a first of a plurality of iterations, each multidimensional feature representation is augmented with a respective class label prediction to form an augmented representation. A set of corrupted samples is generated from the augmented representations. A transformation is learned that minimizes a reconstruction error for the set of corrupted samples. An adapted class label prediction is generated for each of the samples in the collection using the learned transformation. At least a second of the plurality of iterations includes repeating the generating of a set of corrupted samples, learning a transformation, and generating adapted class label predictions. The set of corrupted samples for this iteration are generated from augmented representations that are based on adapted class label predictions from a preceding iteration. Information based on the adapted class label predictions of one of the plurality of iterations is output.

At least one of the steps of the method may be implemented with a processor.

DETAILED DESCRIPTION

Aspects of the exemplary embodiment relate to a computer-implemented system and method for adapting a source classifier to a target domain, without the need to have any labels on the target samples and without the need to have access to the source data used to train the classifier or the parameters of the classifier itself. The system and method enable unsupervised domain adaptation using source classifier predictions for the target samples.

Figure 1:
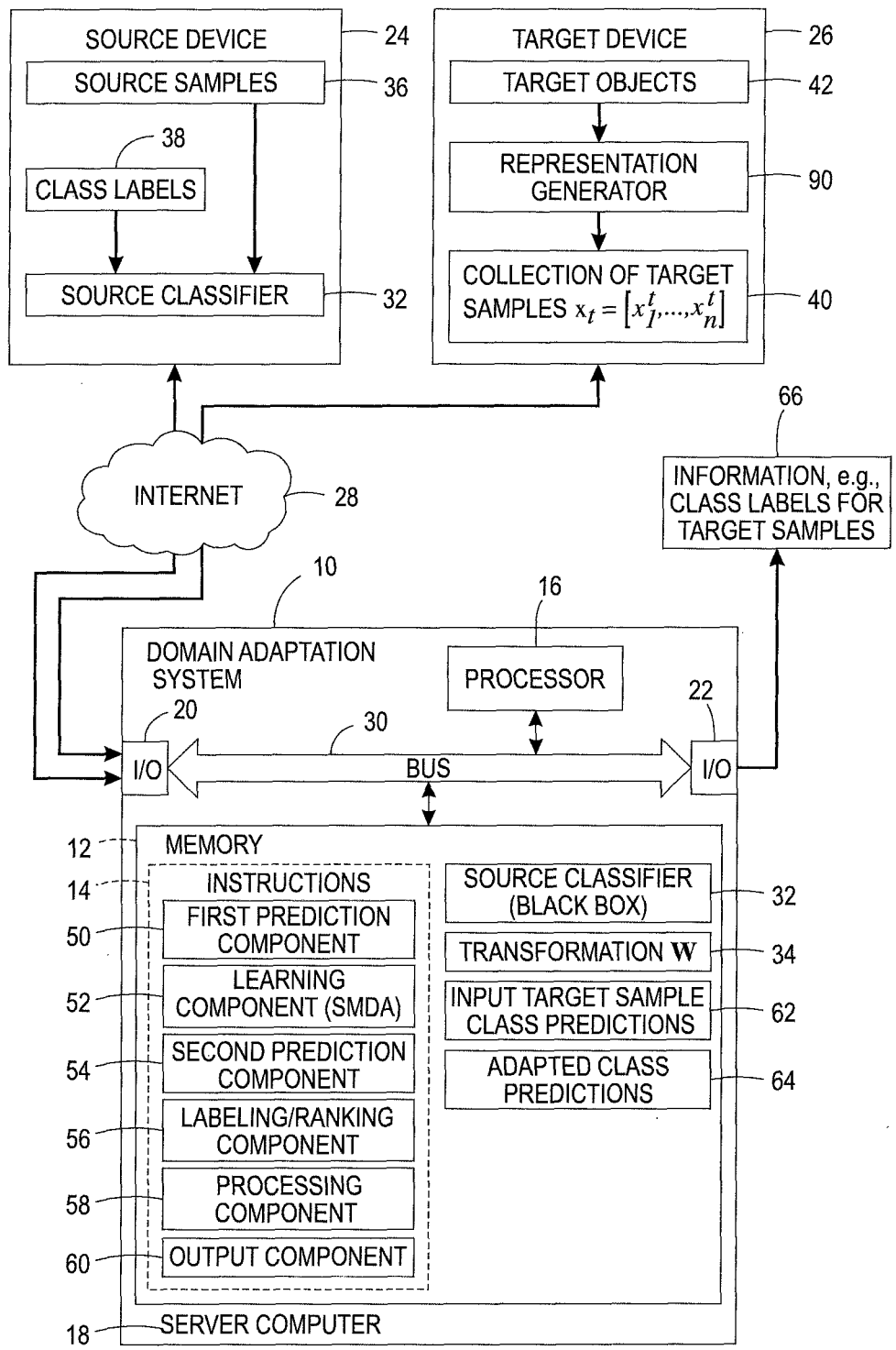
FIG. 1 is a functional block diagram of a domain adaptation system for classification of target samples, such as images or text documents, in accordance with one aspect of the exemplary embodiment.

With reference to FIG. 1, a domain adaptation system 10 in accordance with one aspect of the exemplary embodiment is shown. The system includes memory 12, which stores instructions 14, for performing the method described in FIG. 2 and a processor 16, in communication with the memory, for executing the instructions. The system may be hosted by one or more computing devices, such as the illustrated server computer 18 and include one or more input/output devices 20, 22 for communicating with external devices, such as remote source and target computing devices 24, 26, etc., e.g., via a wired or wireless network, such as the Internet 28. Hardware components 12, 16, 20, 22 of the system 10 may communicate via data/control bus 30.

The system has access to a source classifier 32 which has been trained on source samples 36 and their respective class labels. In some embodiments, the source classifier 32 may include a set of two or more source classifiers, one source classifier for each of a set of classes. In other embodiments, a single classifier is used, such as a multi-class classifier.

The system 10 receives, as input, a collection of unlabeled target samples 40. The target samples may be received from the target device 26. Alternatively, the system 10 receives a collection of target objects 42 and generates the target samples from them on the system.

Each of the source samples 36 may be, for example, derived from a respective object in a set of objects, such as an image or a text document (or combination thereof) in a source domain. Similarly, each of the target samples 36 may be, for example, derived from a respective object in a set of objects, such as images or text documents in a target domain. The target domain differs from the source domain, at least in some minimal respect, such as lighting, location of capture, time, subject matter, or combination thereof. Each source and target sample may be multidimensional feature representation of the respective object, each sample having the same number of dimensions. The source samples are manually labeled by class. As an example, in the case of text documents, the class labels may represent positive and negative opinions expressed in the text of the document, or in the case of images, different visual classes. It is to be appreciated that the method is not limited to images or text representations but may be any feature-based representation, such as numeric values (e.g., a customer profile), representations of audio signals, such as speech, or the like.

The exemplary system 10 has no need to have access to the underlying source data (source samples 36, or the objects they represent) or to the parameters of the source classifier 32. Thus, the source data can remain confidential.

The system 10 generates class labels 44 for the target samples 40 by using class predictions output by the source classifier 32 to learn a transformation 34, denoted W.

The exemplary instructions 14 include a first prediction component 50, a learning component 52, a second prediction component 54, a labeling/ranking component 56, an optional processing component 58, and an output component 60.

The first prediction component 50 inputs the target samples 40 to the source classifier 32 to generate input class label predictions 62 for the target samples. This may include sending the target samples 40 to the remote source device for classification with the source classifier or using the source classifier 32 locally, as a black box.

The learning component 52 learns the transformation W for generating adapted class label predictions 64. In the exemplary embodiment, this is achieved using stacked marginalized denoising autoencoders (SMDA). In particular, the target samples are augmented with the class predictions generated by the first prediction component, and corrupted samples are generated therefrom. The transformation is learned to minimize (over all the corrupted samples) the reconstruction error, i.e., to minimize the error between reconstructed samples and the corrupted samples.

The second prediction component 54 uses the learned transformation 34 to generate adapted class label predictions 64 for each of the target samples, based on the input class label predictions and transformation W.

The labeling component 56 applies a label to each target sample 40, based on the respective adapted class label prediction 64.

The optional sample processing component 58 may implement a computer implemented process, based on the applied label.

The output component 60 outputs information 66, such as the computed class labels, processed sample, or information based thereon.

The computer-implemented classification system 10 may include one or more computing devices 18, such as a PC, such as a desktop, a laptop, palmtop computer, portable digital assistant (PDA), a server computer, cellular telephone, tablet computer, pager, combination thereof, or other computing device capable of executing instructions for performing the exemplary method. For example, the labeling may be performed on a server computer 18 and the labels output to a linked client device 26, or added to a database (not shown), which may be accessible to the system 10 and/or client device 26, via wired or wireless links. Source classifier 32 may be resident on computer 18 or may be retained on the source computer 24.

The memory 12 may represent any type of non-transitory computer readable medium such as random access memory (RAM), read only memory (ROM), magnetic disk or tape, optical disk, flash memory, holographic memory or combination thereof. In one embodiment, the memory 12 comprises a combination of random access memory and read only memory.

The digital processor 16 can be variously embodied, such as by a single-core processor, a dual-core processor (or more generally by a multiple-core processor), a digital processor and cooperating math coprocessor, a digital controller, or the like. The exemplary digital processor 16, in addition to controlling the operation of the computer system 18, executes the instructions 14 stored in memory 12 for performing the method outlined in FIG. 2.

The interface 20 is configured for receiving the target samples 40 (or original target objects 42) and may include a modem linked to a wired or wireless network, a portable memory receiving component, such as a USB port, disk drive, or the like.

The source and target computing devices may be similarly configured to the computer 18, with memory and a processor in communication with the memory for interacting with the system 10.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The exemplary system 10 operates in a transductive setting, where the collection of target samples 40 is fixed and known in advance. There may be for example at least 100 or at least 1000, or at least 5000 samples 40 in the collection. In addition, in the exemplary unsupervised case, no labels in the target domain are available and only predictions from source classifiers 32 can be used.

The approach used to adapt the sample predictions essentially considers the source classifier predictions 62 on the target samples as corrupted by the domain shift between the source domain and the target domain. Unsupervised Stacked Marginalized Denoising Autoencoders (SMDA) are used to reconstruct a corrupted decision rule by the initial classifier 32. Denoising autoencoders are described in P. Vincent, et al., "Extracting and composing robust features with denoising autoencoders," Proc. 25th Int'l Conf. on Machine learning (ICML), pp. 1096-1103, 2008, hereinafter, "Vincent 2008". In experiments conducted on text and image datasets, this approach leads to significant gains despite the lack of source data and despite the lack of labels in the target domain.

Figure 2:
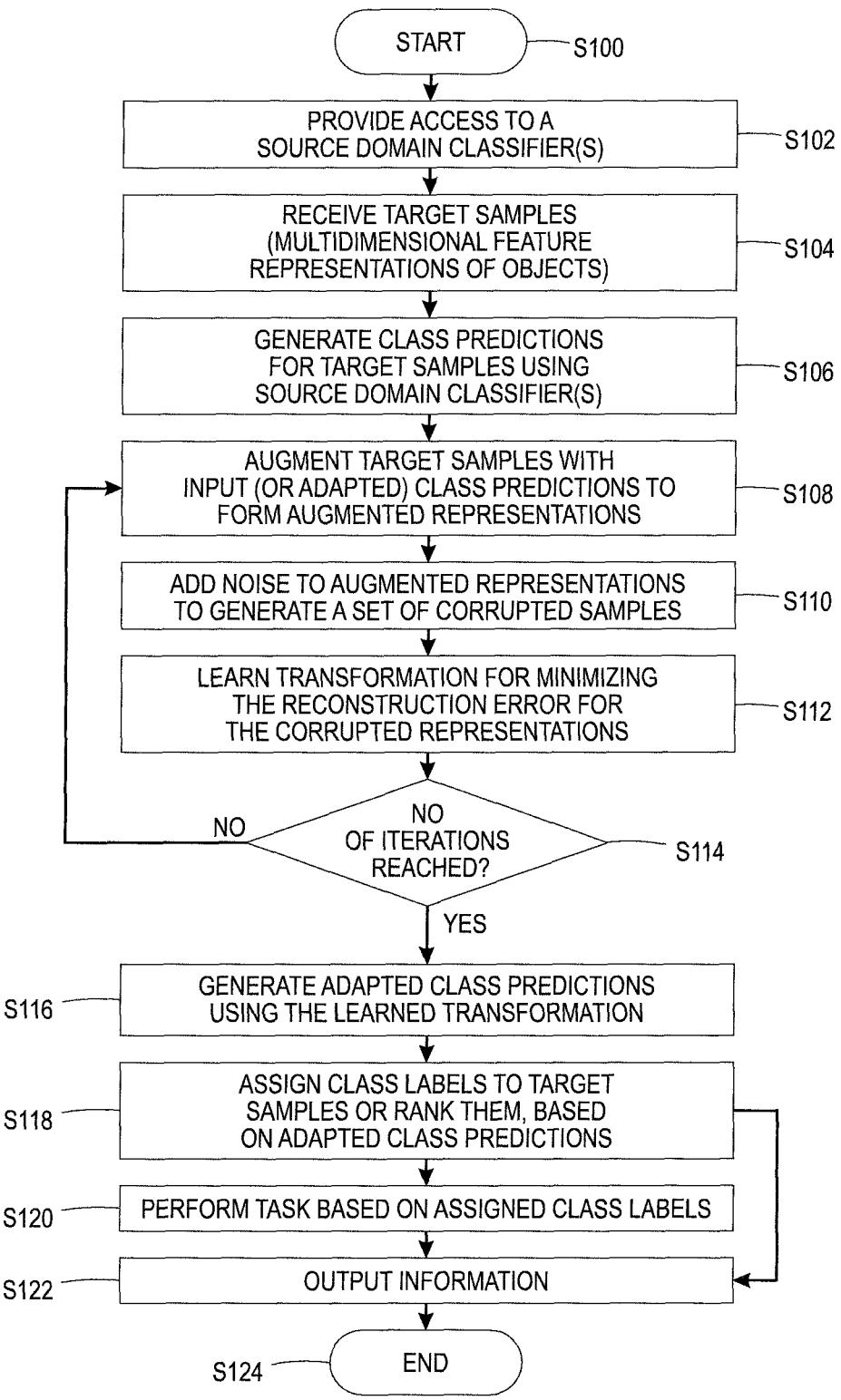
FIG. 2 is a flow chart illustrating a domain-adapted classification method in accordance with another aspect of the exemplary embodiment.

FIG. 2 illustrates a method for domain adaptation which can be performed with the method of FIG. 1. The method begins at S100.

At S102, access is provided to a source classifier 32 which has been trained for labeling source samples (multidimensional representations) obtained from a source domain.

At S104, a collection of target samples 40 (multidimensional representations) is provided, e.g., received from target device 26 or generated from target objects, such as images, text documents (text sequences), or sequences which include symbols from a given alphabet.

At S106, the target samples 40 in the collection are classified using the source classifier 32 to generate input class label predictions 62 for the target samples.

At S108, the target samples are each augmented with the respective class label prediction to form an augmented multidimensional representation.

At S110, corrupted samples are generated from the augmented representations by randomly removing features.

At S112, a transformation W 34 for the corrupted samples is learned that minimizes a reconstruction error, specifically, minimizing the error between reconstructed augmented multidimensional representations and the corrupted samples.

In the exemplary embodiment, steps S108-S112 are performed by the learning component using stacked marginalized denoising autoencoders (SMDA) using a number of iterations (layers). At S114, if the number of iterations has been reached, the method proceeds to S116, otherwise returns to S108, where the augmented representations are now based on the class predictions generated with the transformation produced in in the previous iteration.

At S116, the learned transformation 34 is used, by the second prediction component 54, to generate adapted class label predictions 64 for each (or at least one) of the target samples (this can be performed as the last step of the final iteration).

At S118, labels are applied to each target sample 40, based on the respective adapted class label prediction 64. Alternatively, the target samples 40 may be ranked based on the adapted class label predictions.

At S120, a computer implemented process may be implemented, based on the applied labels of the target samples, by the processing component 58.

At S122, information 66 is output, by the output component 60, such as the adapted class labels, processed sample, or information based thereon.

The method ends at S122.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH- EPROM, or other memory chip or cartridge, or any other non-transitory medium from which a computer can read and use. The computer program product may be integral with the computer 18, (for example, an internal hard drive of RAM), or may be separate (for example, an external hard drive operatively connected with the computer 18), or may be separate and accessed via a digital data network such as a local area network (LAN) or the Internet (for example, as a redundant array of inexpensive of independent disks (RAID) or other network server storage that is indirectly accessed by the computer 18, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

Computer program code for carrying out the method may be written in an object oriented programming language (e.g., JAVA, C++, etc.). The computer program code, however, may also be written in conventional procedural programming languages such as the "C" programming language or in a visually oriented programming environment such as, for example, Visual Basic.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the adaptation method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

Further details of the system and method will now be described.

As an illustrative example, suppose that the task is to extract sentiments (positive/negative) from product reviews. The source samples, which the source classifier 32 is trained, may be reviews of books, while the target samples may be reviews of movies, for example on DVDs. The book reviews may include one or more text sequences such as "I really liked the characters in this book" which may be labeled with a "positive" opinion or "This book is a waste of money, which may be associate with a "negative" opinion label. The aim is to be able to label the target reviews, which may include text sequences such as "The acting was very good," or "This movie was a waste of money." The book and movie opinions may be represented by bag-of-words representations 36, 40 for example. The system 10 has no access to the source reviews, their bag-of-word representations 36, or their labels on which the source classifier 32 was trained. Nor, it is assumed, are there any labels for the samples 40 generated from the movie opinions in the target domain. It may also be assumed that the system 10 has no access to the parameters of the classifier 32. The classifier 32 can be of any type, such as linear regression, logistic regression, etc.

The method assumes that the features of a target sample that is given a "positive label" by the source classifier 32 will more likely to be associated with a positive label than features of other samples. In this way, correlations between features and the positive (resp., negative) class can be extracted from the features of multiple target samples.

Let $X_t \in \mathbb{R}^{n \times m}$ be the target dataset 40, which can be in the form of a matrix of n target samples $x_i^t$, each described with m features. $X_t = [x_1^t, \ldots, x_n^t]$. For simplicity, a binary class problem $Y \in \{0,1\}$ is considered, although the method can be extended to the case where Y can assume one of three or more specific values, as in a multi-class problem, as described below. Let the predictions on target samples by the source classifier be denoted $P_s(Y=y|x_i^t)$, $i=1, \ldots, n$, i.e., the source classifier outputs a prediction $P_s$ of the class label being y (e.g., "good" opinion in the illustrative case) for each sample i in the target domain. These predictions as considered as having been corrupted by the domain shift.

Let $z_i = [x_i^t; P_s(Y=y|x_i^t)]$ represent the target sample augmented with the respective source classifier prediction. This can be a simple concatenation of the feature vector $x_i^t$, and its class prediction $P_s$, e.g., as an m+1 dimensional vector.

The augmented dataset $Z=[z_1 z_2 \ldots z_n]$ is thus generated and can be stored as an n×(m+1) matrix in this case (it may be larger than m+1 where there is more than 1 class label).

A denoising autoencoder is used to reconstruct the target data augmented with the source classifier predictions. The denoising autoencoder learns to reconstruct an approximation of Z (denoted Z') from a corrupted version of Z, denoted $\tilde{Z}$. The autoencoder learns a linear operator that minimizes the reconstruction error of the corrupted version of the data $\tilde{Z}$. In particular, it finds a transformation (e.g., a matrix) W which minimizes a norm of the difference between the reconstructed data and transformed corrupted data: $\|Z' - W\tilde{Z}\|^2$. Several denoising autoencoders are stacked to form a Stacked Marginalized Denoising Autoencoder (SMDA) which is learned, for example, using the method of Chen 2012. This joint reconstruction enables the system to learn correlations between all features in the dataset.

In the exemplary embodiment, W is a square matrix, $W \in \mathbb{R}^{m+1 \times m+1}$ and can be interpreted as a way to capture correlations between the original and augmented features. The new features obtained by SMDA correspond roughly to the reconstruction of the input augmented matrix, given by WZ'. (A bias term is also involved in the computation). In a standard SMDA, these features are then used to train a classifier. In the present case, however, the denoised predictions on the target samples are used to generate labels.

For a binary class problem, each of the adapted predictions values (these are not guaranteed to be a probability) can be defined by a sum, over all m+1 features, of the product of the jth row of matrix W (denoted $W_{m+1,j}$) and the respective value $z_{i,j}$ of the augmented feature set $z_i$:

$$h_{rec}(Y=y|x_i) = \Sigma_j W_{m+1,j} z_{i,j}, \qquad (1)$$

where each row vector $W_{m+1}$ of the matrix W represents the correlation between the initial classifier predictions $P_s(Y=y|x_i)$ and the target features. j is the index over the features. This can be computed for each target sample individually or in a joint computation.

The final label decision can made by assigning the class when $h_{rec}$>0.5 in a binary class problem or by taking the maximum score in a multi-class case.

Algorithm 1 summarizes all steps of the induction domain adaptation method.

---

Algorithm 1 Transductive domain adaptation with denoising autoencoder

Require: Target dataset $X_t \in \mathbb{R}^{n \times m}$ without labels
Require: (Probabilistic) source classifier $P_s, \mathbb{R}^m \to [0..1]$
  1: Generate class predictions $P_s(Y = y|x_i^t)$ on all target samples, i = 1, ..., n
  2: Compose an augmented dataset $Z = [X_t; P_S]$, $Z \in \mathcal{R}^{n \times m+1}$
  3: Use SMDA to learn $W = \min_w ||Z' - W\tilde{Z}||^2$
  4: Get denoised class predictions $h_i^{rec}(Y = y|x_i) = \Sigma_j W_{m+1,j} z_{i,j}$
  5: Label $x_i$ with y if $h_i^{rec}(Y = y|x_i) > 0.5$ (optional)
  6: return Labels (or ranking) for $X_t$

---

SMDA

The exemplary SMDA component 52 used herein can be based on the stacked marginalized Denoising Autoencoder (SMDA) described in Chen 2012, which will now be briefly described.

Denoising autoencoders (DA) are one-layer neural networks that are optimized to reconstruct input data from partial and random corruption (Vincent 2008). These denoisers can be stacked into deep learning architectures in which each subsequent layer operates on the output of the previous layer. In conventional systems, the weights are fine-tuned with back-propagation. Alternatively, the outputs of intermediate layers can be used as input features to other learning algorithms. These learned feature representations have been found to improve classification accuracy in many cases. SDAs have been applied to domain adaptation (see Glorot 2011), where these learned features in combination with a linear SVM classifier have shown good performance in benchmark sentiment analysis tasks.

One drawback of conventional SDAs is the long training time, which often entails specialized computing supports such as GPUs, especially for large-scale tasks. To address this problem, a variation of SDA is described in Chen 2012, where the random corruption is marginalized out. This step yields the optimal reconstruction weights computed in a closed form and eliminates the need of back-propagation for tuning. Features learned with this approach have been reported to lead to classification accuracy comparable with SDAs, with a remarkable reduction of the training time (Chen 2012; Xu 2012).

Figure 3:
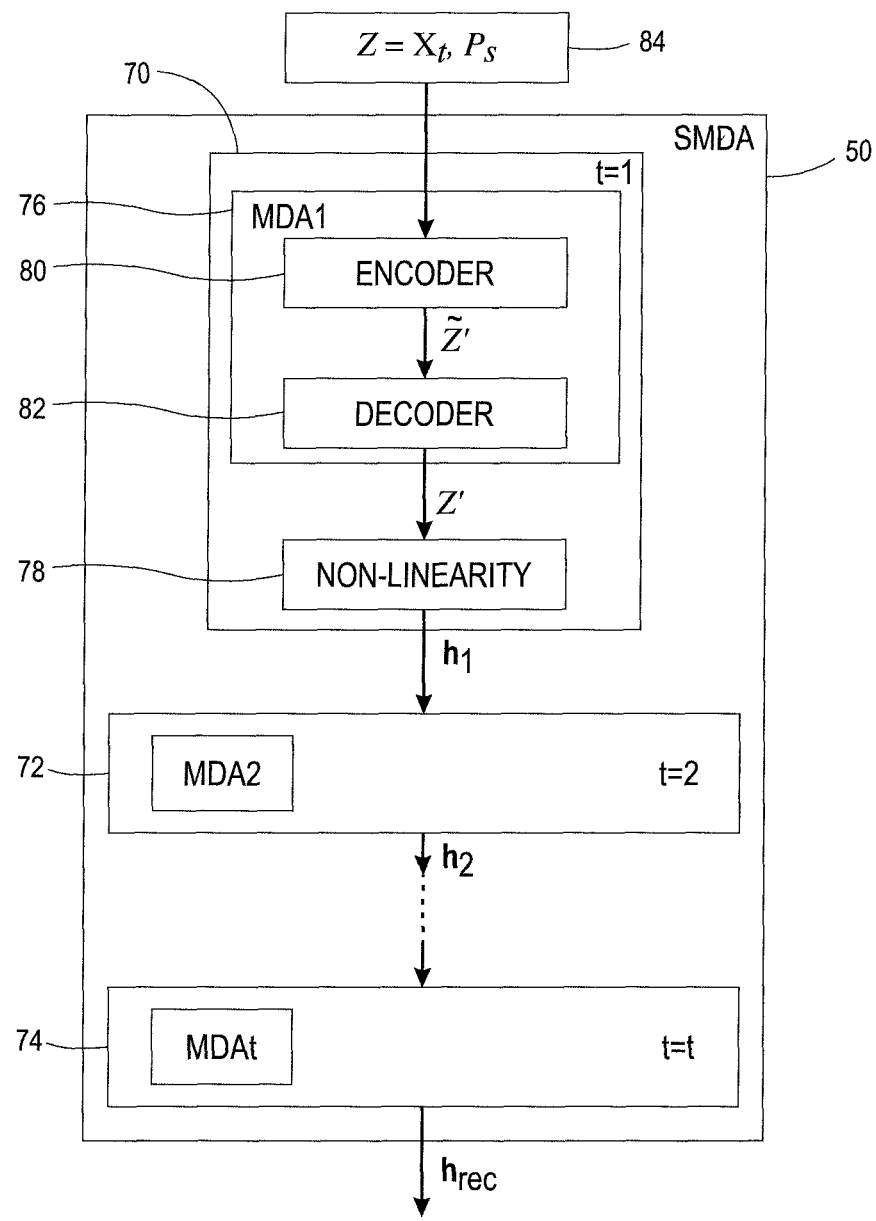
FIG. 3 illustrates an exemplary learning component in the system of FIG. 1.

As illustrated in FIG. 3, the basic building block of the exemplary SMDA 52 is a one-layer linear denoising autoencoder. The SMDA 52 is a stack of t such layers 70, 72 74, etc., each layer including a linear denoising autoencoder (MDA) 76. Each autoencoder includes an encoder 80 and a decoder 82 (only the components of the first layer are shown for ease of illustration). Each encoder 80 takes as input a collection of samples Z and corrupts them by adding random noise to give corrupted samples $\tilde{Z}$. The decoder 82 then attempts to reconstruct the input samples producing a set of reconstructed samples Z'. In the present method, the first layer 70, the input 84 to the autoencoder 80 is the augmented dataset Z.

Accordingly, from a given collection 40 of n input samples, instances $x_1, \ldots, x_v$ are sampled with replacement, where typically $v > |n|$. Here, $x_i$ is used to indicate the concatenation of $x_i^t$ with its corresponding probability, $P_s(Y=y|x_i^t)$. These inputs are corrupted by random feature removal, i.e., a feature is removed (set to 0) with a pre-defined probability p, where 0<p<1. In the present method, this may be extended by removing each feature k with its own probability $p_k$, k=1, ..., d, where d is the dimensionality of the features vectors, which is (m+1) in the case of a binary classifier. The corrupted version of a given sample $x_i$ is denoted as $\tilde{x}_i$. The decoder reconstructs the corrupted inputs with a linear mapping $W: \mathbb{R}^d \to \mathbb{R}^d$, that minimizes the overall squared reconstruction loss:

$$L(W) = \frac{1}{v}\sum_{i=1}^{v} ||x_i - W\tilde{x}_i||^2. \qquad (2)$$

where $||x_i - W\tilde{x}_i||$ is the norm of $x_i - W\tilde{x}_i$ and v represents the number of corrupted samples.

A constant feature can be added to the input, $x_i = [x_i; 1]$, and an appropriate bias b can be incorporated within the mapping W=[W; b]. The constant feature is never corrupted. A matrix $Z=[x_1, \ldots, x_v]$ denotes the inputs and its corrupted version is denoted $\tilde{Z}=[\tilde{x}_1, \ldots, \tilde{x}_v]$. Then the solution of (2) can be expressed as the closed-form solution for ordinary least squares:

$$W = PQ^{-1} \text{ where } Q = \tilde{Z}\tilde{Z}^T \text{ and } P = Z\tilde{Z}^T \qquad (3)$$

and T is the transpose.

The solution to (3) depends on the re-sampling of $x_1, \ldots, x_p$, and which features are randomly corrupted. It would be advantageous to consider all possible corruptions of all possible inputs when the denoising transformation W is computed, i.e. letting $v \to \infty$, however, this is generally impractical. By the weak law of large numbers, the matrices P and Q converge to their expected values $\mathbb{E}[Q]$ and $\mathbb{E}[P]$ as more copies of the corrupted data are created. In the limit, their expectations can be derived and the corresponding mapping for W expressed in a closed form as $W = \mathbb{E}[P]\mathbb{E}[Q]$, where the expectation of Q for a given entry i,j in matrix $\mathbb{E}[Q]$, denoted $\mathbb{E}[Q]_{ij}$, and the expectation of P for a given entry in matrix $\mathbb{E}[P]$, denoted $\mathbb{E}[P]_{ij}$ can be expressed as follows:

$$\mathbb{E}[Q]_{ij} = \begin{cases} S_{ij}q_i q_j, & \text{if } i \neq j, \\ S_{ij}q_i, & \text{if } i = j, \end{cases} \text{ and } \mathbb{E}[P]_{ij} = s_{ij}q_j \qquad (4)$$

where: $i \neq j$ indicates those values that are not on the diagonal of the matrix $\mathbb{E}[P]$, and i=j those values that are on the diagonal of the matrix;

$q=[1-p_1, \ldots, 1-p_d, 1] \in \mathbb{R}^{d+1}$, where each element $q_i$ represents the probability of a feature i surviving the corruption, and $q_i q_j$ represents the probability of features i and j both surviving the corruption $= (1-p)^2$;

p is the noise level for the respective feature;

d is the feature dimensionality; and $S = ZZ^T$ is the covariance matrix of the uncorrupted data Z and $S_{ij}$ is an element of the matrix S.

This formulation is a departure from Chen 2012, where one noise is used for all features, $p_1 = p_2 = \ldots = p_d$. This closed-form denoising layer with a unique noise p for each feature is referred in the following as a Marginalized Denoising Autoencoder (MDA).

As illustrated in FIG. 3, a deep architecture can be created by stacking together several MDA layers where the representations of the $(t-1)^{th}$ denoising layer are fed as the input to the $t^{th}$ layer. The reconstructed inputs serve as the inputs Z for the next layer (optionally after a non-linear operation). The number of MDA layers 70, 72, 74 may be, for example, at least 2, or at least 3 or at least 4 and may be up to 100, or up to 20, or up to 10, or 5 or 6.

Each transformation $W^t$ is learned to reconstruct the previous MDA output $h_t$ from its corrupted version. In order to extend the mapping beyond a linear transformation, a non-linear function 78 between layers is applied. For example, each layer's representation is obtained from the preceding layer through tangent-hyperbolic nonlinearities:

$$h_t = \tan h(W^t h_{t-1}),  \quad (5)$$

where $h_0 = x$ denotes the input,
or, alternatively, rectified linear units (RELU):

$$h_t = \max(W^t h_{t-1}, 0) \text{ (setting values less than } -1 \text{ to } 0) \quad (6)$$

Prediction with the SMDA

In the exemplary embodiment, denoised class predictions for each of the samples $x_i$ in the collection are obtained using Eqn. 1 from the matrix W generated in layer t and the input features Z.

Due to the transductive nature of the method, it does not learn a new classifier. If a new batch of objects 42 needs to be classified, the source classifier 32 is adapted again from scratch.

Samples

At the remote computing devices 24, 26 a respective representation generator 90 (similarly configured) may be used to generate the multidimensional samples 36, 40 representing the objects in the input feature space, based on features extracted from the source/target objects.

In the case of images, for example, the sample generated for each object 42 can be any suitable high level statistical representation of the image, such as a multidimensional vector generated based on features extracted from the image. Fisher Kernel representations, Bag-of-Visual-Word representations, run length histograms, and representations generated with convolutional neural networks (CNNs) are exemplary of such high-level statistical representations which can be used herein as an image representation.

The images being represented may be in any convenient file format, such as JPEG, GIF, JBIG, BMP, TIFF, or the like or other common file format used for images and which may optionally be converted to another suitable format prior to processing. The images may be still photographs or frames from a video sequence. In general, each input digital image includes image data for an array of pixels forming the image.

The bag-of-visual-words (BOV) method entails extracting a set of local descriptors, encoding them using a visual vocabulary (i.e., a codebook of prototypes), and then aggregating the codes into an image-level (or region-level) descriptor. These descriptors can then be fed to classifiers, typically kernel classifiers such as SVMs. See, Sivic, at al., "Video Google: A text retrieval approach to object matching in videos," ICCV, vol. 2, pp. 1470-1477, 2003; Csurka, et al., "Visual categorization with bags of keypoints," ECCV SLCV workshop, pp. 1-22, 2004; and U.S. Pub. Nos. 20080069456 and 20110091105. Approaches which encode higher order statistics, such as the Fisher Vector (FV) can provide improved results on a number of image classification tasks. See, Sánchez, et al., "Image classification with the fisher vector: Theory and practice," IJCV, 2013; Perronnin, et al., "Fisher kernels on visual vocabularies for image categorization," CVPR, pp. 1-8, 2007, Perronnin, et al., "Improving the fisher kernel for large-scale image classification," ECCV, pp. 143-156, 2010; Sanchez, et al., "Improving the fisher kernel for large-scale image classification," Proc. 11$^{th}$ European Conf. on Computer Vision (ECCV): Part IV, pp. 143-156 (2010); Sanchez, et al., "High-dimensional signature compression for large-scale image classification," CVPR 2011, and U.S. Pub. Nos. 20120076401 and 20120045134.

In the case of Fisher Kernel representations and Bag-of-Visual-Word representations, low level visual features, such as gradient (e.g., SIFT), shape, texture, or color features, or the like are extracted from patches of the image. The patches can be obtained by image segmentation, by applying specific interest point detectors, by considering a regular grid, or simply by the random sampling of image patches. In the exemplary embodiment, the patches are extracted on a regular grid, optionally at multiple scales, over the entire image, or at least a part or a majority of the image. Each patch includes a plurality of pixels and may include, for example, at least 4, or at least 16 or at least 64 or at least 100 pixels. The number of patches per image or region of an image is not limited but can be for example, at least 16 or at least 64 or at least 128. The extracted low level features (in the form of a local descriptor, such as a vector or histogram) from each patch can be concatenated and optionally reduced in dimensionality, to form a features vector which serves as the global image signature. In other approaches, the local descriptors of the patches of an image are assigned to clusters. For example, a visual vocabulary is previously obtained by clustering local descriptors extracted from training images, using for instance K-means clustering analysis. Each patch vector is then assigned to a nearest cluster and a histogram of the assignments can be generated. In other approaches, a probabilistic framework is employed. For example, it is assumed that there exists an underlying generative model, such as a Gaussian Mixture Model (GMM), from which all the local descriptors are emitted. The patches can thus be characterized by a vector of weights, one weight per parameter considered for each of the Gaussian functions forming the mixture model. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object (e.g., ball or sphere, rod or shaft, flower, autumn leaves, etc.), characteristic background (e.g., starlit sky, blue sky, grass field, snow, beach, etc.), or the like. Given an image to be assigned a representation, each extracted local descriptor is assigned to its closest visual word in the previously trained vocabulary or to all visual words in a probabilistic manner in the case of a stochastic model. A histogram is computed by accumulating the occurrences of each visual word. The histogram can serve as the image representation or input to a generative model which outputs an image representation based thereon.

Various methods exist for generating representations based on neural networks. In this method, the sample to be represented (e.g., an image or a text document) is input to a sequence of convolutional layers and fully-connected layers. See, Krizhevsky, et al., "ImageNet classification with deep convolutional neural networks," NIPS, pp. 1106-1114, 2012; Zeiler, et al., "Visualizing and understanding convolutional networks," ECCV, pp. 818-833, 2014; Sermanet, et al., "OverFeat: Integrated recognition, localization and detection using convolutional networks," ICLR, 2014; Simonyan, et al., "Very Deep Convolutional Networks for Large-Scale Image Recognition," arxiv 1409.1556, 2014. Convolutional networks or "ConvNets" are trained in a supervised fashion on large amounts of labeled data. These models are feed-forward architectures involving multiple computational layers that alternate linear operations, such as convolutions or average-pooling, and non-linear operations, such as max-pooling and sigmoid activations. The image representation may be derived from the output of the final fully-connected layer, or from one of the intermediate layers. In some embodiments, the advantages of Fisher vectors and CNN's can be combined using a framework as described, for example, in U.S. application Ser. No. 14/793,434, filed Jul. 7, 2015, entitled EXTRACTING GRADIENT FEATURES FROM NEURAL NETWORKS, by Albert Gordo Soldevila, et al.

Run length histograms are described in U.S. Pub. No. 20100092084.

For generating samples 40 from objects 42 comprising text documents, at least a portion of the words in the document are considered as the features and a histogram of word frequencies is computed. The histogram may consider the frequencies of each of a fixed word vocabulary (and/or short sequences of words), such as a limited dictionary of words/phrases which may exclude certain words commonly found in all documents (stop words). A transformation, such as a term frequency-inverse document frequency (TF-IDF) transformation, may be applied to the word frequencies to reduce the impact of words which commonly appear in the documents being represented. The word/phrase frequencies may be normalized, e.g., with L2 normalization. The result is in a vector of normalized frequencies (a document representation), where each element of the vector corresponds to a respective dimension in the multidimensional space. One suitable method for representing documents relative to the importance of words in the documents which may be used herein is described in U.S. Pub. No. 20130297622, published Nov. 7, 2013, entitled MEASURING INFORMATIVE CONTENT OF WORDS IN DOCUMENTS IN A DOCUMENT COLLECTION RELATIVE TO A PROBABILITY FUNCTION INCLUDING A CONCAVITY CONTROL PARAMETER, by Stéphane Clinchant, the disclosure of which is incorporated herein by reference in its entirety. See, also, H. Bay, et al, "SURF: Speeded up robust features," ECCV, pp. 404-417, 2006, hereinafter, Bay 2006.

Each multidimensional feature representation 36, 40 includes m features (dimensions), where m may be at least 10, or at least 50, or at least 100, or at least 1000, or more.

Alternative Embodiments

While the method has been described for use in domain adaptation, it is not limited to this case. It may also be used in semi-supervised learning, where there is no access to the training data. For example, if a classifier is trained on a limited training set, it may be deployed on another set. This classifier could also be refined on a private dataset without retraining the model and accessing the original training data.

Although in the embodiment described above, a different noise parameter for the SMDA is used for each feature, in another embodiment, p is fixed. For example, it may be fixed to 0.9 for all datasets (text and images) and still perform well.

Example Applications

There are numerous applications in which the system and method find application, such as in the classification of forms from different organizations, classification of opinions in reviews of products and services, customer inquiries, health care data, classification of transportation-related images, and the like.

As a specific example, transportation images, such as images of vehicles (or their occupants) and number plates, where differences in capturing conditions (daylight vs night, inside parking vs. outside parking, camera and viewpoint changes) can lead to data sources with domain shift. This can affect the feature distribution and render conventional classifiers/detectors trained on one source less effective. Domain adaptation can be used to reduce the amount of manual labeling needed for each condition by exploiting the classifier(s) 32 already available for other conditions. For example, a classifier trained to determine the number of occupants of a vehicle (e.g., for assessing compliance of vehicles traveling in high occupancy vehicle (HOV) lanes) can be used for classifying similar images obtained from a different location or time of day, where lighting conditions may be different. U.S. Pub. No. 20150279036, incorporated herein by reference, describes such a system. In this case, vehicles passing an image capture device may be reviewed in batches, with a captured image of each vehicle's number plate stored for later use in identifying those vehicles that are not in compliance.

In the context of sentiment analysis and opinion mining, customer comments concerning different services/products can vary considerably from one type of service/product to another. However, common features may be useful in assessing whether the customers are satisfied or not. Hence predictions from a classifier learned on one type of service or product can be readily adapted for a new type of product or service.

Other applications include classification problems such as predicting preference in recommendation settings and personalization applications.

In the above-mentioned example domains, there may be legislation on privacy and data protection, which specify that the original images/documents are private and thus cannot be stored other than for a short period of time. This presents an obstacle to many domain adaptation techniques which assume an unlimited access to the source objects. By removing access to the initial source objects/samples, these privacy concerns can be met, since the classifiers trained on them do not allow the reconstruction of the original content.

Advantages of the exemplary method include the following:

1) The method is has low computational cost with results comparable to many complex existing methods.

2) The method can be applied in applications where customers care about their privacy issues (e.g., document images, medical fields, etc.) and are not ready to share the whole source data, only classifiers from which it is not possible to reconstruct the original documents. As an example, a generic classifier could be subsequently adapted on a customer site automatically. For example, a generic sentiment classifier model may be developed which can be deployed for a new customer/domain. The classifier model can be automatically adapted, without annotations on the domain and without any exchange of data between the supplier and the customers.

3) The method has only a few parameters. While fine-tuning them can yield better performance, it is possible to select reasonable prefixed values based on the data type and the document representation used.

4) The system and method find particular application in a domain adaptation scenario where only automatic decision making procedures, such as classification, are available from the source domains. SMDA is used to reconstruct the classification rule.

5) The absence of source data is offset by the predictions from the source classifiers.

6) The method is not limited to any particular type of classifier.

7) The absence of labeled target data is not problematic as significant gains can be achieved without any labels.

8) Experiments show consistent improvements on all datasets.

Most existing domain adaptation methods assume the access to the source examples and many of them exploit the minimum discrepancy between domains, the unsupervised transformation of domains, etc.

In the method of B. Gong, et al., "Connecting the dots with landmarks: Discriminatively learning domain-invariant features for unsupervised domain adaptation," Proc. 30th Int'l Conf. on Machine Learning, ICML 2013, pp. 222-230, 2013 has a large number of parameters to tune. The geodesic flow kernel does not work well for text datasets (B. Gong, et al., "Geodesic flow kernel for unsupervised domain adaptation," 2012 IEEE Conference on Computer Vision and Pattern Recognition (CVPR), pp. 2066-2073, 2012). In addition, these unsupervised DA methods all require access to source data.

Similarly, the approach described in U.S. application Ser. No. 14/504,837 assumes access to the source data for domain adaptation.

Without intending to limit the scope of the exemplary embodiment, the following Examples illustrate the applicability of the method.

EXAMPLES

The experiments conducted revealed that this approach leads to significant gains compared to the raw classifier.

The method was evaluated on several text and image datasets. For text datasets, standard domain adaptation datasets (Amazon reviews and 20Newsgroups) were used. 28 domain adaptation tasks (24 from Amazon and 4 from Newsgroups) were evaluated. All these tasks have a single source domain and one target domain. The SMDA noise was set to 0.9 for all datasets. It was observed that this was a good value for the autoencoder on texts.

In the experiments, a Bag-of-visual words (BOV) representation (G. Csurka, et al., "Visual categorization with bags of keypoints," Workshop on statistical learning in computer vision, ECCV Workshop, Vol. 1, No. 1-22, pp. 1-2, 2004) built on SURF features (Bay 2006) or set of deep convolutional activation features (B. Gong, et al., "Connecting the dots with landmarks: Discriminatively learning domain-invariant features for unsupervised domain adaptation," Proc. 30th Int'l Conf. on Machine Learning, ICML 2013, Atlanta, Ga., USA, 16-21 Jun. 2013, pp. 222-230, 2013). These features are obtained with the publicly available Caffe (8 layer) CNN model, available on the qithub website. See, I.-H. Jhuo, et al., "Robust visual domain adaptation with low-rank reconstruction," CVPR, pp. 2168-2175, 2012, trained on the 1000 classes of ImageNet (Vincent 2008) used in the ILSVRC 2012 challenge, available on the image-net website.

For image datasets, the Office31 and Office+Caltech10 dataset were used. Deep features from Caffee were used and several transfer tasks considered. All these tasks are multi-source problems and first all the source domains were merged before training a classifier. The SMDA noise was set at 0.9 as in the text dataset.

Datasets

OC10: The Office+Caltech10 is a dataset frequently used for testing image domain adaptation techniques (see, B. Gong, et al., "Reshaping visual datasets for domain adaptation," Advances in Neural Information Processing Systems (NIPS), pp. 1286-1294 (2013); R. Gopalan, et al., "Domain adaptation for object recognition: An unsupervised approach," ICCV, pp. 999-1006 (2011); B. Fernando, et al., "Unsupervised visual domain adaptation using subspace alignment, ICCV, pp. 2960-2967 (2013); M. Baktashmotlagh, et al., "Unsupervised domain adaptation by domain invariant projection," ICCV, pp. 769-776, 2013). SURF BOV features for the dataset are available at http://www-scf.usc.edu/boqinggo/domain_adaptation/GFK_v1.zip.

Deep Convolutional Activation Features were also used, as described above. The dataset includes four domains: Amazon (A), Caltech (C), dslr (D) and Webcam (W) with 10 common classes. Each domain is considered in its turn as the target domain, with the other domains considered as source domains. For the target set, three samples per class were selected to form the training set and the rest were used as the test set. In the experiments the last fully connected layer (caffe_fc7) was used as the image representation. The dimensionality of these features is 4096.

OFF31: the Office31 dataset (see, K. Saenko, et al., "Adapting visual category models to new domains," ECCV, Vol. 6314 of Lecture Notes in Computer Science, pp. 213-226, 2010) has previously been used for comparing domain adaptation methods. It subsumes the OffCal10 dataset and contains images of 31 product classes downloaded from amazon.com (Amazon) or taken in an office environment using a webcam or digital SLR camera (dslr), respectively. The experimental framework is similar to the OC10 case, and again in addition to the image SURF BOV features available at http://www.cs.uml.edu/saenko/projects.html#data, caffe_fc7 features were also extracted.

AMT: The Amazon text dataset includes product reviews in different domains. If a book review can be quite different to a kitchen item review, there are nevertheless some common features to assess whether the reviewer was satisfied with their purchase. A sub-part of this collection has been preprocessed, which has been used subsequently in several studies for domain adaptation. See, J. Blitzer, et al., "Domain adaptation with coupled subspaces," Int'l Conf. on Artificial Intelligence and Statistics (ICAIS), pp. 173-181; 2011). First, the task is to predict whether a customer review is positive or negative where a review with more than 3 stars is considered as positive and (strictly) less than 3 as negative. After preprocessing, the text documents are represented by a bag of unigrams and bigrams. For these experiments, only the top 10,000 features were considered, based on their document frequency and the four domains used in most studies: kitchen, dvd, books and electronics.

Newsgroup: The 20 Newsgroup dataset is a very popular dataset for text categorization. It includes around 20,000 documents with 20 classes. Furthermore, it was used to evaluate transfer learning and domain adaptation methods. For standard text classification, only a subset of categories were used: 'comp.sys.ibm.pc.hardware', 'comp.sys.mac.hardware', 'sci.med', 'rec.sport.baseball', 'rec.sporthockey', and 'sci.space'. Rare words appearing less than 3 times were filtered out. As the 20 classes have a hierarchical structure, domain adaptation problems can be simulated by training only on some leaf categories and testing on their sister categories. For example, a source category could be 'science' with 'sci.crypt and 'sci.electronic' and the target equivalent of this category could be 'sci.med' and 'sci.space'. Following the settings of Pan, et al. "Transfer Learning for Text Mining," *Mining Text Data*, pp. 223-257(2012), the two tasks defined as 'comp vs sci' and 'rec vs talk' were used. Again, rare words are filtered out and at most 10,000 features were kept as in the Amazon case.

TABLE 1 shows the label prediction accuracy obtained on text documents for the baseline source classifier (which was learned by logistic regression on labeled source samples, without adaptation) and for the exemplary method. For all datasets, the present method outperforms the baseline, with an average of accuracy increasing from 0.7711 to 0.8105. The results indicate that the method is able to adapt the source classifier without access to source data and source classifier parameters. Table 1 also shows the respective area under the curve (AUC), which compares the rankings of the objects with the correct rankings, which again showing consistent improvements.

TABLE 1

Accuracy on Text Domain Adaptation Tasks

| Dataset ID | Accuracy | | | AUC | |
|---|---|---|---|---|---|
| | Baseline | Exemplary method | Gain | Baseline | Exemplary method |
| 0 | 0.8077 | 0.8308 | 0.0231 | 0.8997 | 0.9154 |
| 1 | 0.8154 | 0.8602 | 0.0448 | 0.9001 | 0.9429 |
| 2 | 0.7862 | 0.8294 | 0.0432 | 0.8794 | 0.9308 |
| 3 | 0.8267 | 0.8425 | 0.0158 | 0.9079 | 0.9227 |
| 4 | 0.8044 | 0.8581 | 0.0537 | 0.8886 | 0.9382 |
| 5 | 0.7664 | 0.8248 | 0.0584 | 0.8587 | 0.9156 |
| 6 | 0.7803 | 0.8160 | 0.0357 | 0.8640 | 0.9067 |
| 7 | 0.7420 | 0.7886 | 0.0466 | 0.8259 | 0.8827 |
| 8 | 0.8702 | 0.8801 | 0.0099 | 0.9486 | 0.9526 |
| 9 | 0.7576 | 0.8063 | 0.0487 | 0.8474 | 0.8968 |
| 10 | 0.7425 | 0.7958 | 0.0533 | 0.8175 | 0.8826 |
| 11 | 0.8980 | 0.9035 | 0.0055 | 0.9616 | 0.9632 |
| 12 | 0.7510 | 0.7765 | 0.0255 | 0.8555 | 0.8659 |
| 13 | 0.7735 | 0.8200 | 0.0465 | 0.8685 | 0.9164 |
| 14 | 0.7360 | 0.7875 | 0.0515 | 0.8543 | 0.9102 |
| 15 | 0.7940 | 0.8095 | 0.0155 | 0.8772 | 0.8939 |
| 16 | 0.7710 | 0.8195 | 0.0485 | 0.8545 | 0.9062 |
| 17 | 0.7325 | 0.7645 | 0.0320 | 0.8174 | 0.8787 |
| 18 | 0.7475 | 0.7790 | 0.0315 | 0.8321 | 0.8738 |
| 19 | 0.7195 | 0.7475 | 0.0280 | 0.7996 | 0.8407 |
| 20 | 0.8380 | 0.8520 | 0.0140 | 0.9294 | 0.9340 |
| 21 | 0.7295 | 0.7800 | 0.0505 | 0.8165 | 0.8662 |
| 22 | 0.7230 | 0.7610 | 0.0380 | 0.7998 | 0.8477 |
| 23 | 0.8665 | 0.8800 | 0.0135 | 0.9449 | 0.9486 |
| 24 | 0.6552 | 0.7290 | 0.0738 | 0.7837 | 0.8497 |
| 25 | 0.7134 | 0.8069 | 0.0935 | 0.7748 | 0.8999 |
| 26 | 0.7167 | 0.7579 | 0.0412 | 0.8256 | 0.9342 |
| 27 | 0.7273 | 0.7864 | 0.0591 | 0.8384 | 0.9296 |

TABLE 2 shows weights for the features associated with the initial predictions. Words with smallest/biggest weights in the autoencoder with respect to the initial predictions are shown. For an Amazon dataset (Books to Electronics), the autoencoder matrix W was used and the $W_{m+1}$ vector was sorted to see which words were associated with the probability of being positive.

TABLE 2

Words with smallest/biggest weights in the autoencoder with respect to the initial predictions

| Smallest Weights | Biggest Weights |
|---|---|
| no | great |
| was | my |
| number | sound |
| don't | easy |
| after | excellent |

TABLE 2-continued

Words with smallest/biggest weights in the autoencoder with respect to the initial predictions

| Smallest Weights | Biggest Weights |
|---|---|
| money | good |
| if | easy_to |
| work | best |
| bad | yo |
| get | a_great |
| buy | when |
| support | well |
| because | works |
| waste | the_best |
| just | also |
| didn't | very |
| got | love |
| i'm | nice |
| too | quality |
| does_not | highly |

TABLE 3 compares the accuracy of the baseline source classifier and the present method for images.

TABLE 3

Accuracy on Image Tasks

| Dataset ID | Baseline | Exemplary method |
|---|---|---|
| 0 OC10 amazon | 0.938 | 0.953 |
| 1 OC10 caltech | 0.906 | 0.915 |
| 2 OC10 dslr | 0.962 | 0.962 |
| 3 OC10 webcam | 0.973 | 0.990 |
| 4 OFF31 amazon | 0.593 | 0.622 |
| 5 OFF31 dslr | 0.972 | 0.980 |
| 6 OFF31 webcam | 0.893 | 0.927 |

The gains are more modest than for text but still beneficial. As will be appreciated, using a multi-source classifier is already a strong baseline and may leave less room for improvements than conventional classifiers.

An experiment relating to transductive classification was also performed (this is not strictly a domain adaptation task but may be suited to predicting classes for news articles which arrive in batches). A subset of 20Newsgroup (6 classes) was taken and a classifier trained on a 100 documents per class. The same method was used to reconstruct the probability predictions. TABLE 4 shows that the AUC is improved compared to the baseline.

TABLE 4

AUC for Transductive Classification on 20NG4

| Class | AUC Exemplary Method | Baseline |
|---|---|---|
| 'comp.sys.ibm.pc.hardware' | 0.930 | 0.882 |
| 'comp.sys.mac.hardware' | 0.907 | 0.852 |
| 'rec.sport.baseball' | 0.907 | 0.873 |
| 'rec.sport.hockey' | 0.959 | 0.930 |
| 'sci.med' | 0.970 | 0.932 |
| 'sci.space' | 0.952 | 0.884 |

The results suggest that domain adaptation problems can be solved with unsupervised domain adaptation with source classifiers predictions, thus addressing the 'privacy' constraint and the lack of labels. The marginalized autoencoder (as in Chen 2012) is able to reconstruct a corrupted decision rule from the initial classifiers. Experiments on text and image datasets show that significant gains can be achieved, despite the lack of source data and despite the lack of labels in the target domain.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A classification method comprising:
   providing access to a pretrained classifier which has been trained on source samples in a source domain and their respective class labels,
   thereafter, receiving a collection of unlabeled target samples for a target domain, different from the source domain, each target sample comprising a multidimensional feature representation;
   with the pretrained classifier, generating a class label prediction for each of the target samples in the collection;
   for at least one iteration, without access to source samples from the source domain,
   augmenting each target sample multidimensional feature representation with a respective class label prediction output by the pretrained classifier to form an augmented representation,
   generating a set of corrupted target samples from the augmented representations, and
   learning a transformation that minimizes a reconstruction error for the set of corrupted target samples;
   generating an adapted class label prediction for at least one of the target samples in the collection using the learned transformation; and
   outputting information based on the adapted class label prediction,
   wherein the augmenting, generating a set of corrupted samples, learning a transformation, and generating an adapted class label prediction are performed with a hardware processor.

2. The method of claim 1, wherein the generation of the corrupted samples includes removing features from the augmented representations with a predefined probability.

3. The method of claim 1, wherein the adapted class label prediction is generated without access to data that was used to train the classifier.

4. The method of claim 1, wherein the method is performed without access to labeled samples in the target domain.

5. The method of claim 1, wherein at least one iteration includes a plurality of iterations and wherein in a later one of the iterations, the augmented representation is based on the adapted class label predictions of a previous one of the iterations.

6. The method of claim 5, further comprising applying a non-linear function to the class predictions between the previous and later iterations.

7. The method of claim 1, wherein the learning of the transformation includes reconstructing the augmented representations from the corrupted samples and learning a transformation which minimizes an error between the corrupted samples and reconstructed augmented representations.

8. The method of claim 1 wherein the learning of the transformation includes learning $W = \min_W \|Z' - W\tilde{Z}\|^2$, where W represents the transformation, $Z'$ represents a set of augmented representations reconstructed from the corrupted samples, and $\tilde{Z}$ represents the set of corrupted samples.

9. The method of claim 1, wherein the generating of the adapted class label prediction for the at least one sample in the collection includes computing a product of the transformation and the multidimensional feature representation.

10. The method of claim 1, wherein the transformation comprises a matrix.

11. The method of claim 1, wherein the generating of the set of corrupted samples from the augmented representations comprises generating a greater number of corrupted samples than the number of samples in the collection of samples.

12. The method of claim 1, wherein the output information comprises at least one of a label for the sample and a ranking of the sample.

13. The method of claim 1, further comprising implementing a process based on the adapted class label prediction and the outputting of information includes outputting information generated in the process.

14. The method of claim 1, wherein the samples each comprise a representation of at least one of an image and a text sequence.

15. A computer program product comprising a non-transitory recording medium storing instructions which, when executed by a processor, perform the method of claim 1.

16. A system comprising memory which stores instructions for performing the method of claim 1 and a processor in communication with the memory for executing the instructions.

17. A classification system comprising:
   a first prediction component which uses a pretrained classifier to generate a class label prediction for each sample in a collection of unlabeled samples, each sample comprising a multidimensional feature representation;
   a learning component which learns a transformation, the learning component including a stack of autoencoders, each of the autoencoders including an encoder which corrupts input feature vectors and a decoder which reconstructs the input feature vectors from the corrupted feature vectors, the transformation being learned to minimize the reconstruction error, wherein in a first of the layers, the input feature vectors include the multidimensional feature representations augmented by their class label predictions output by the pretrained classifier and in a second of the layers, the input feature vectors are based on class label predictions output by the first layer;
   a second prediction component which generates an adapted class label prediction for at least one of the samples in the collection using the learned transformation;
   an output component which outputs information based on the adapted class label prediction; and
   a hardware processor which implements the components.

18. The classification system of claim 17 wherein the system includes the pretrained classifier but does not have access to training samples which were used to learn the classifier.

19. A classification method comprising:
   receiving a collection of target samples in a target domain, each sample comprising a multidimensional feature representation;
   with a pretrained classifier trained on labeled source samples in a source domain, generating a class label prediction for each of the target samples in the collection;

with a hardware processor, in a first of a plurality of iterations, augmenting each multidimensional feature representation with a respective one of the class label predictions generated by the pretrained classifier to form an augmented representation, generating a set of corrupted samples from the augmented representations, learning a transformation that minimizes a reconstruction error for the set of corrupted samples, and generating an adapted class label prediction for each of the target samples in the collection using the learned transformation;

in at least a second of the plurality of iterations, repeating the generating of a set of corrupted samples, learning a transformation, and generating adapted class label predictions, wherein the set of corrupted samples are generated from augmented representations that are based on adapted class label predictions from a preceding iteration; and outputting information based on the adapted class label predictions of one of the plurality of iterations.

20. The classification method of claim 19, wherein the method is performed without access to labeled samples in the source domain and target domain.

* * * * *